UNITED STATES PATENT OFFICE.

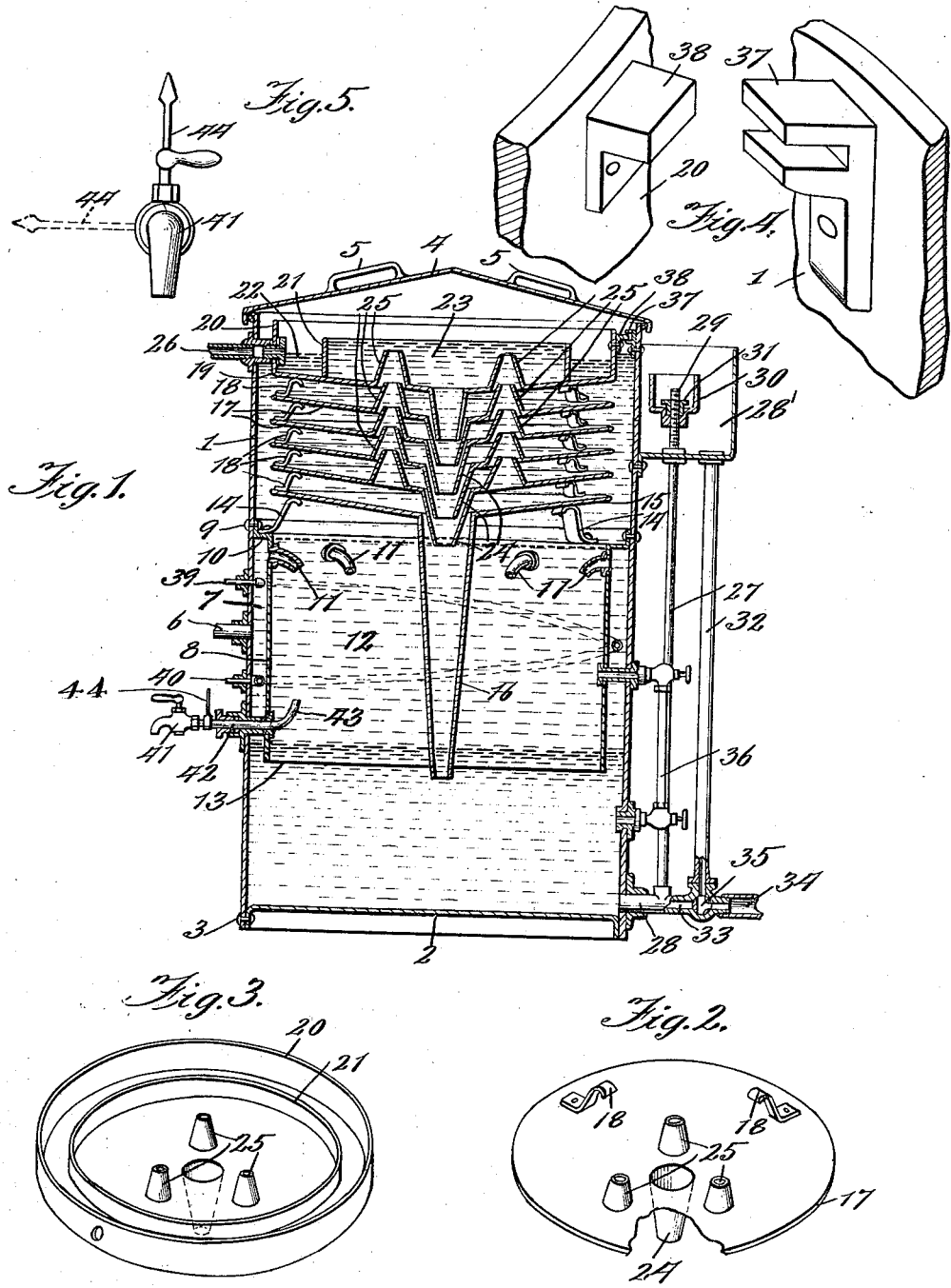

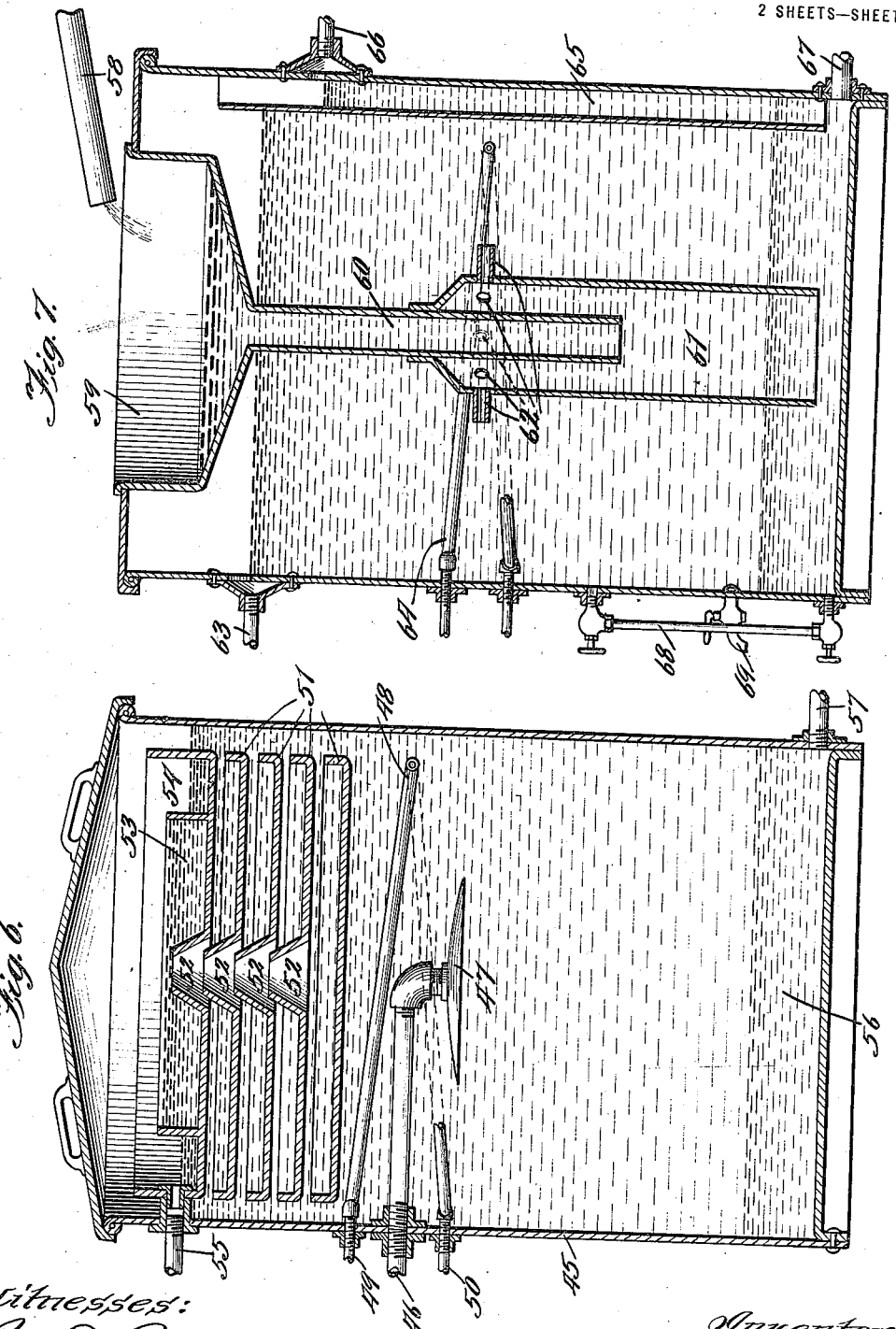

WILLIAM L. MORRIS, OF CHICAGO, ILLINOIS, ASSIGNOR TO S. F. BOWSER & CO. INC., OF FORT WAYNE, INDIANA, A CORPORATION OF INDIANA.

SEPARATOR.

1,176,774.  Specification of Letters Patent.  Patented Mar. 28, 1916.

Application filed April 25, 1910. Serial No. 557,319.

*To all whom it may concern:*

Be it known that I, WILLIAM L. MORRIS, a citizen of the United States, residing at Chicago, in the county of Cook and State of Illinois, have invented certain new and useful Improvements in Separators, of which the following is a specification.

This invention relates to separators and has for its primary object to provide an improved construction, combination and arrangement of parts in separators for removing water from a mixture of oil and water.

One object is to provide an improved device of this character which will be rapid and efficient in action, economic and simple in construction and in which the parts are readily accessible.

Another object is to provide improved means whereby the water level in a device of this character may be maintained substantially constant or varied within certain limits.

Another object is to provide improved means for ascertaining the condition of the fluid in the neighborhood of the water level in the separator chamber.

Another object is to provide improved means whereby samples of the fluid may be withdrawn at different levels adjacent the water level in the separator chamber.

Another object is to provide improved means for adjusting the water level in said separator chamber.

Other and further objects will appear in the specification and be more specifically pointed out in the claims, reference being had to the drawings exemplifying the invention.

In the drawings, Figure 1 is a vertical section of the preferred embodiment of this invention. Fig. 2 is a perspective view partly broken away of one of the precipitating trays or pans to be referred to hereinafter. Fig. 3 is a perspective view of the uppermost precipitating tray or pan. Fig. 4 is a fragmentary view in perspective showing the method of mounting the uppermost tray on the side walls of the separator housing. Fig. 5 is a front view of the sampling device. Fig. 6 is a vertical section of a modified form of the invention. Fig. 7 is a vertical section of still another modification of the invention.

Referring to the embodiments shown in the drawings and first to that embodiment shown in Figs. 1 to 5 inclusive, the main separator housing is here shown cylindrical in form and comprises an outer cylindrical shell 1 having a bottom 2 secured thereto in any suitable manner, preferably by a plurality of rivets 3. Said shell is open at the top and provided with a round cover 4, said cover having thereon handles 5 whereby it may be readily removed and replaced at will. An inlet pipe 6 for the mixture of oil and water and other ingredients suspended in the mixture, enters the shell 1 of the housing, preferably at a point approximately midway of the height of said housing. The inlet chamber 7 of the separator is provided by having an inner cylindrical shell 8 secured to the outer cylindrical shell by means of rivets 9 or other suitable fasteners, said shell 8 being provided with an outwardly flanged portion 10 for spacing said shell from the outer shell 1. Said inner shell 8 depends to a point in the housing adjacent to which it is desired to maintain the water level to be hereinafter referred to and is arranged and constructed to leave an annular opening between the inlet chamber 7 and the lower portion of the main separator chamber wherein the water accumulates. Adjacent the upper end of the inlet chamber 7 the inner shell 8 is perforated at a plurality of points and provided with inwardly projecting spouts or nozzles 11 through which the partially purified fluid is introduced into the inner separator chamber 12 through which the fluid moves with a relatively slow movement. The water and other heavier impurities of the mixture which becomes separated in the inlet chamber 7, sink downwardly into the lower portion of the separator adjacent the bottom 2. By reason of the slower movement of the fluid through the inner chamber 12 further separation is brought about by the heavier portions of the partially purified fluid being enabled to seek their level causing the oil and lighter portions to be forced upwardly toward the precipitating pans or trays to be presently referred to.

In order to prevent intermixture of the separated fluids in the inlet chamber 7 and the inner chamber 12, the water level in the bottom of the separator is maintained above the lower edge 13 of the inner shell 8, thus providing a water seal for the inner chamber 12. Projecting upwardly and inwardly from the annular shoulder formed by the offset 10 of the inner shell 8 are a plurality of supports 14 upon the inner upper ends of which is supported the lowermost precipitating pan or tray 15 which is preferably dished to provide an inclination toward the center of said pan which preferably co-incides with the axis of the separator. Depending from said pan or tray 15 and extending around an opening in the center thereof is a water-return pipe 16, the lower end of which reaches preferably to a point adjacent the lower edge 13 of the inner shell 8. Arranged in a tier above the lowermost pan or tray 15 are a plurality of other trays 17 of somewhat similar construction, each tray 17 being supported from the one below by means of upwardly projecting arms 18. The uppermost tray 19 is partly supported in a similar manner upon arms 18 but is of a different construction from the other pans or trays being provided with an outer cylindrical wall 20 for closing it out of communication with the annular space extending around the periphery of the other pans or trays, and an inner cylindrical wall 21, which provides an annular receptacle 22 and an inner basin 23. Each of the pans or trays above the lowermost is provided with a central depending nozzle or nipple 24 coaxially arranged with the pipe 16 and nesting one in the other in such manner as to place each of the trays in communication with a passage way formed through said nipples while at the same time cutting off said trays from communication with each other by the central opening therethrough. In addition each tray above the lowermost is provided with a plurality of upwardly projecting nipples 25 which are also arranged in a plurality of tiers to provide passageways from the lowermost pan or tray 15 to the inner basin 23 of the uppermost tray 19. Said nipples 25 at the same time cut off communication from adjacent trays by reason of the upward flow therethrough and restrict the upward passage of fluid so that the flow is practically uniform over all of the trays. As the partly purified oil flows inwardly from the peripheries of the several pans or trays, a still further separation of water and other relatively heavy ingredients is made possible, any precipitation which may occur in each tray being returned by the pipe 16 to the water space at the bottom of the separator, the oil being forced upwardly through the nipples 25 and overflow into the settling basin 23 where if there still be any water or other relatively heavy ingredients, it may be directed down through the nipples at the center into the pipe 16. After the settling basin 23 has become filled the oil overflows into the annular chamber 22 from whence it passes outwardly through the outlet 26, preferably to an oil filter where the purification is completed. The overflow level of the oil is therefore maintained at the top of the settling chamber 23.

In order to provide means for maintaining the level of the water sufficiently high to seal the lower end of the inner chamber 12, a stand pipe 27 is preferably employed, which is connected below by a branch 28 with the lower end of the separator chamber. Said stand pipe 27 passes upwardly through the bottom of an overflow chamber 28' and is provided above with screw threads at 29 whereon an overflow cup 30 is threaded, the joint between the cup and the end of the stand pipe being packed by a packing nut 31 which also acts as a check nut.

Leading from the overflow chamber 28' is a drain pipe 32 which preferably parallels the stand pipe 27 and is provided with a connection 33 leading to the stand pipe. Leading outwardly from the drain pipe 32 is an outlet pipe 34. At the intersection of the drain 32, outlet pipe 34 and connection 33 leading to the stand pipe 27, is a three-way cock 35 by means of which the overflow chamber 28' may be left in communication with the outlet 34 as shown in the drawings, thus making the overflow level for water at the top of the cup 30. On the other hand, should it be desired to raise the water level higher or to the top of the overflow chamber 28', the three-way cock 35 may be turned to connect the connection 28 with the drain 32, thus permitting the water to accumulate in the drain 32 and to fill up the overflow chamber 28'. When, however, the drain 32 is opened to the outlet 34, the overflow cup 30 may be adjusted along the standpipe 27 to adjust the water level in the separator in an obvious manner. A sight-gage 36 makes it possible to tell the level of the water in the separator at any time.

As shown more clearly in Fig. 4, the uppermost tray or pan 19 is provided with an additional support from the cylindrical housing 1 by means of a slotted bracket 37 mounted on the inner wall of said housing and an angle bracket 38 mounted on the outer cylindrical wall 20 of said pan and adapted to interengage with said slotted bracket 37.

In order to facilitate the separation of the oil and water, steam may be admitted through a steam pipe 39, and after being passed about the inner chamber 12 preferably through the inlet chamber 7, may be discharged at 40. In order to provide means for removing the lower strata of oil immediately above and adjacent the water level, an outlet cock 41 may be connected with the interior of the chamber 12 by means of a tubular connection 42. Preferably, this connection is rotatably mounted in a suitable socket and provided with a deflected end portion 43 which, when the pipe 42 is rotated, is moved to different levels in the chamber 13. Without the housing 1 and on the tubular connection 42 may be mounted an indicator or pointer 44 which may be made to extend the same distance from the rotating axis of the tubular connection 42 and in the same direction therefrom to indicate the exact level at which the inlet end of the pipe 42 is located. By the use of this device, the separator system is saved a great deal of work that would otherwise be required of it, inasmuch as the foul oil immediately above the water level can be used for lubricating track switches, rough open gears, and other rough mechanisms. When in use, the pipe portion 43 may be swung about to draw off foul oil at any desired level, or may be set to a fixed level, and oil drawn therefrom repeatedly without changing its level, in either case serving as a regular service drain-off.

Referring now to Fig. 6, in which is shown a modification of the invention according to which no allowance is made for draining water from the sediment pans or trays, a cylindrical housing 45 has the fluid mixture introduced thereinto by means of an inlet pipe 46, said pipe 46 being provided on its inner end with a dripping sprayer 47. Extending about the sprayer 47 is preferably arranged a steam pipe 48 having an inlet at 49, and an outlet 50. Disposed above the sprayer 47 and supported in any suitable manner (not shown on the drawing) are a plurality of pans or trays 51, each of which is provided with an upwardly projecting cylindrical flange leaving a narrow annular opening between it and the next pan or tray above it.

Projecting upwardly from each of the pans or trays above the lowermost, is a frusto-conical nipple 52, said nipple being disposed to provide a restricted passage through into the uppermost tray while shutting off each tray from communication with the tray adjacent thereto. The uppermost tray is provided with a central settling chamber 53 which overflows into an outer annular chamber 54, said annular chamber discharging through an outlet 55. In this embodiment of the invention, the movement of fluid over the trays and throughout the entire separator is slow and retarded, because of the restricted upward passages through the nipples 52, thus enabling a complete precipitation of the water which collects at the bottom as indicated by the reference numeral 56. The narrow annular openings leading to the several trays through which the oil must pass to reach the outlet 55, serves to make the separating action more effective. As occasion demands, the water may be drawn off at the bottom of the separator through a pipe 57.

Referring now to the embodiment shown in Fig. 7, in which no sediment trays are made use of, this embodiment shows a construction which can be made comparatively cheap, but at the same time quite effective in operation. In this embodiment the inlet chamber shown in Fig. 1 is omitted, the fluid mixture is introduced through a pipe 58 into the sediment basin 59, a separating action taking place as the oil and water and other ingredients sink through the depending tube 60 attached to said basin 59. The lower end of the tube 60 communicates with a chamber 61 about midway of the height of said chamber so that as soon as the mixture reaches the lower end of said tube, the oil rises upwardly into the chamber 61 and passes outwardly through a plurality of nozzles or openings 62, and thence on upwardly to an oil discharge outlet 63 in the outer cylindrical wall of the separator. A steam pipe 64 serves to facilitate the separating action. Communicating with the bottom end of the separator in this embodiment is a stand pipe 65 of modified form provided with an overflow outlet 66. For draining or cleaning the separator an outlet pipe 67 is provided in the lower cylindrical wall of the separator. A sight gage 68 serves to indicate the height of the water level while a spigot 69 provides means for drawing off a sample of the fluid adjacent to the water level.

While I have exemplified my invention by a specific description of the embodiments shown in the drawings, I do not wish to be limited to the specific construction, combination and arrangement of parts shown therein, there obviously being many modifications possible within the spirit of my invention.

What I claim is—

1. In a separator, the combination with an outer shell, of an inner shell forming an annular chamber between it and the outer shell, said annular chamber being closed above, an inlet into said annular chamber, and an outlet for oil from the upper end of said chamber, said inner shell being perforated adjacent its upper end to provide fluid passages.

2. In a separator, the combination with an outer shell closed at the bottom, of an inner shell forming an annular chamber between it and the outer shell, said annular chamber being closed above, an inlet into said annular chamber, a plurality of precipitating trays above said annular chamber, and an outlet for oil above said trays.

3. In a separator, the combination with an outer shell, of an inner shell with an outwardly projecting flange forming an inclosed annular chamber between said shells, said inner shell being perforated adjacent its upper end, and a precipitating tray mounted above said annular chamber and spaced therefrom, said tray being provided with a depending tube extending through said inner shell.

4. In an oil and water separator, the combination of a chamber provided with an oil inlet above and a water inlet below, a variable level draw-off intermediate the inlet and outlet consisting of a fixed cock outside of the chamber, a bent tube therefor rotatable within the chamber to place its inner end at various heights, and a pointer connected to the rotatable tube outside of the chamber to indicate the position and height of the inlet end of the tube.

5. A separator provided with a plurality of precipitating trays, said trays being provided with alined up-taking but restricted passages adjacent the center.

6. A separator comprising a plurality of superposed precipitating trays having spaced peripheries, and each of said trays being provided with unobstructed connections adjacent the center for conducting the oil from each tray upwardly through a restricted passage in the other trays.

7. In a separator, the combination of a plurality of precipitating trays having their peripheries spaced apart, each of said trays being provided with an upwardly projecting restricted nipple adjacent the center and said trays being provided with connections for precipitating the heavier portions of the fluid and the uppermost tray being provided with an upwardly projecting shell into which all of said trays discharge, and an over-flow leading from said shell.

8. In a separator, the combination with an uppermost tray provided with an overflow and a lowermost tray provided with a depending pipe, of a plurality of intermediate trays, all of said trays being spaced apart and open around their peripheries, a tubular restricted passage connecting the uppermost tray with each of the other trays independent of the peripheral opening, a tubular connection between each tray and said depending pipe, and a housing for said trays provided with a lower chamber in which the oil and water separate by gravity, said chamber being in open communication with the space about the peripheries of said trays.

9. In a separator, the combination of a plurality of sediment trays nested together, a plurality of upwardly projecting nipples connected with different trays respectively, said nipples being nested to provide a restricted channel from the space above the lowermost tray to the uppermost tray and held separated to provide a discharge opening from each of the other trays into said passage, and a depending nipple connected to each of the trays, said depending nipples being nested and spaced to provide a water outlet from all of said trays.

10. In a separator, the combination of a plurality of sediment trays nested together, a plurality of upwardly projecting nipples connected with different trays respectively, said nipples being nested to provide a restricted channel from the space above the lowermost tray to the uppermost tray and held separated to provide a discharge opening from each of the other trays into said passage, a depending nipple connected to each of the trays, said depending nipples being nested and spaced to provide a water outlet from all of said trays, a housing surrounding said trays, said housing being provided with a chamber below the trays for gravity separated volumes of oil and water, and a pipe forming a continuation of the lowermost nipple and extending below the plane of separation between the oil and water.

11. In a separator for oil and water, the combination of precipitating trays coaxially spaced to receive fluid around their peripheries, each of said trays being provided with a frusto-conical nozzle for the tray below and upward extending restricted nozzles for the tray above, said nozzles being arranged to project each within the other lower or higher corresponding nozzle.

12. In a separator for oil and water, the combination with a precipitating chamber, of a plurality of removable precipitating trays receiving fluid at their periphery and discharging a restricted amount adjacent the center, and handles for each tray, said handles being adapted to hold the trays apart.

13. In a separator for oil and water, the combination with a precipitating chamber, of a plurality of removable recipitating trays receiving fluid at their periphery and discharging a restricted amount adjacent the center, and handles for each tray, said handles being adapted to hold the trays apart, the uppermost tray being provided with means for supporting it independently of the other trays.

14. In a separator for water and oil, the combination with a precipitating chamber provided with a tier of submerged precipitating trays over which the oil is passed from periphery toward the center, a removable cover for enabling the removal of said trays, the uppermost tray being provided with a settling basin into which the other trays discharge and with an annular chamber extending around said basin, said annular chamber being partitioned off from the space around the peripheries of the other trays, and an overflow opening from said annular chamber, said basin being disposed to overflow into said annular chamber.

15. In a separator, the combination with an over-flow tray, of a series of superposed trays disposed below the overflow tray and spaced apart over the edges of which fluid passes in parallel, the trays being each provided with an upwardly extending tube which resists the upward flow of fluid to the overflow tray to such an extent that the same amount of fluid will pass over each tray.

In testimony whereof I have signed my name to this specification, in the presence of two subscribing witnesses, on this 12th day of April, A. D. 1910.

WILLIAM L. MORRIS.

Witnesses:
Roy C. Walker,
Frederick G. Veir.